Figure 2:
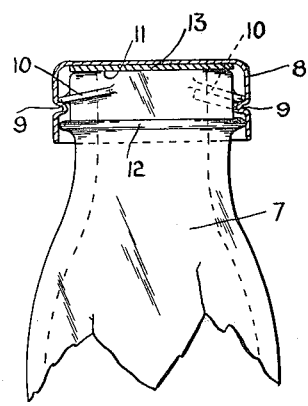

Mar. 6, 1923.

J. M. W. KITCHEN

METHOD OF TREATING MILK

Filed Dec. 9, 1918

1,447,251

WITNESS

INVENTOR
J. M. W. Kitchen.

Patented Mar. 6, 1923.

1,447,251

UNITED STATES PATENT OFFICE.

JOSEPH MOSES WARD KITCHEN, OF EAST ORANGE, NEW JERSEY.

METHOD OF TREATING MILK.

Application filed December 9, 1918. Serial No. 265,882.

*To all whom it may concern:*

Be it known that I, JOSEPH MOSES WARD KITCHEN, a citizen of the United States, residing in the city of East Orange, county of Essex, State of New Jersey, have invented an Improved Method of Treating Milk, of which the following is a specification.

The object of the invention is to secure safety and wholesomeness, as well as digestive suitability in milk, especially that which is intended for infant feeding, that will be better than what is found in milk treated in the methods of the prior art. In detail, this aimed for superiority consists in the following particulars:

1st: that there has been no nutritive loss in the milk due to ferment or chemical changes in the constituents of the milk.

2nd: that no accumulation has occurred in the milk of ferment-putrefactive or other products due to fermentation of any kind.

3rd: that the milk is entirely free from living pathogenic bacteria; and is so free from a living content of non-pathogenic germs that their presence is of negligible importance.

4th: that the milk is entirely free from the diffused poisons due to the destruction of germs that proliferate in milk after the production of the milk at temperatures ranging between 35° F. and 100° F. or over.

5th: that the milk shall have been modified so as to measurably approximate in similitude to human milk, both as to the amounts of increasing its several nutritive constituents and as to it digestibility by flocculating the milk.

6th: that the milk may have been somewhat dehydrated prior to its transportation to market, and preferably, under a non-coagulative heat and a less than atmospheric pressure.

7th: that the milk shall have been hermetically sealed before conveyance to market and been conveyed to market in a state of substantially non-fermentative temperature; and, 8th: that the milk shall be free from a considerable amount of the infections that frequently occur during the final home preparation of the milk for immediate consumption.

In other words, the application of my method avoids or eliminates the defects that have always been more or less present in raw, pasteurized, so-called "certified", dried, condensed and evaporated marketed milks, as previously treated. This improvement is effectuated at a reduction in cost of the milk to the consumer below the cost of grades of milk of the most esteemed character hitherto marketed.

This result is secured in part, by carrying out the following combination of steps:

1st: All reasonable effort is exerted in securing a cleanly production of the milk by methods well known, tho not requiring some of the expensive procedures practiced in producing so-called "certified" milk.

2nd: A special milk treating plant is provided, which is preferably located in close proximity to or sufficiently close to the point of production of the milk to insure a delivery of the milk at the treating plant within two hours after its production; and certainly, before the milk has undergone any fermentation. A more distantly located treating and distributing plant necessitates the conveyance of the milk to the plant in a non-fermentative state of temperature. At this treating and distributing plant the milk is treated as follows: It, with or without modification, is heated to and held at, or approximating to, or considerably lower than at a pasteurizing temperature; and during its heating, the volatile diffusive ferment putrefactive products originating in the cow or elsewhere, are eliminated from the milk, and preferably, without subjecting the milk to free aerial contact. Coincidently, the milk may be somewhat dehydrated, tho not to a degree that will prevent the concentrated milk from easily pouring from a container having a moderately small pouring orifice. The heating, eliminating and concentrating are preferably effected in a partial vacuum, and at a temperature not higher than, or prolonged beyond a time that is needed to secure pasteurization of the milk, because it is well to heat the milk as little as may be required. Inasmuch as the development of bacteria and bacterial products in milk is objectionable, my method avoids exposure of the milk to aerial contact to a great degree and hence avoids the encouragement of the growth of some bacteria that may be in the milk. In the present application I am claiming the use of a vacuum exhaust and moderate degrees of heat that will avoid damage to the milk. As the elimination of the volatile contaminants in milk thru the aid of heat, reduces the water content of the milk, the present invention includes the addition of enough water to the milk before the heating of the milk to make good the amount carried off in the vapor from the milk during its heating, if purified whole milk is to be marketed and if its purification is effected under a partial vacuum; or else, if the milk be considerably dehydrated, it is then marketed as a condensed article.

3rd: If dehydrated, the concentrated milk is now placed in the transporting final container, which is hermetically sealed against infecting contaminations. The container preferably used is of glass, and preferably, is of a size to contain only enough milk to nourish an infant for twenty four hours. I aim at freshness in the milk to prevent growth of undestroyed germs that survive pasteurization; for no pasteurized milk can be known to be absolutely sterile. In general form, the container is elongated, has a moderately small orifice, and a rounded bottom. The object of this form of bottom, besides ease in thorough cleaning, is to discourage those using the milk from leaving the container open during the intermissions between successive pourings from the container, and hence subject to aerial infections when not closed. Sectional measuring indicators or calibrating marks are blown on the bottle for convenience in securing the pouring of definite amounts from the bottle. The closure preferred is a stopper of cork that has been sterilized in and coated with heated paraffine. This stopper should be tightly replaced after each pouring; and this allows of the container-bottle being laid on its side on ice, or in the ice chest, without loss of milk from the container. After the stopper is in place, the stopper part of the closure of the filled bottle and the pouring lip of the bottle, are dipped into very hot melted paraffine and then encased in a flexible metal capsule which protects the closure exteriorly from infections.

4th: The container and its contents is then subjected to a further heating sufficient to destroy the usual infections that usually occur in milk and those that may occur to the milk in the bottling process. This procedure can be conveniently performed in an enclosed apartment provided with both steam heating and brine cooling means. After its heating, the milk is cooled to near its freezing point, and is held at that temperature until the shipment of the milk to market. This deep chilling of the milk has for its object to prevent proliferation of any undestroyed residue of germs in the milk that may survive pasteurization; and also to store an available considerable source of refrigerative influence in the milk itself.

5th: The milk in the sealed container is preferably conveyed to market in sheetcork lined insulated enclosed cases having sufficient depth to allow for the placing of finely comminuted ice on and above the containers.

Milk treated in this manner has not been subjected to the damaging ferment preservative influences usually applied in canning milk; but it can be known when delivered to the consumer to be in a substantially perfect state of preservation, as well as being devoid of dangerous or menacing infections and contaminations, for a much longer time of holding than ordinary bottled milk is usually held. The method contemplates a daily delivery of milk freshly prepared, of the character herein described.

The milk may be treated without modification; but preferably if for infant feeding, it has some modifying preparation and admixture, such for instance as hydrated dextrinized barley flour, before it is heated. It will be obvious that the modification may be limited to a standardization of an increased cream content of the milk, while the addition of flocculating matters such as barley, oatmeal, whey albumen, etc., may be added at the house of the consumer. By effecting the treatment at or close to the point of producing the milk, a very considerable amount of unnecessary expense is avoided in the transportation and distribution of heavy bottles, water, ice and transportation cases; and the user of the milk economizes in ice, and storage space in the household ice chest. In this method, besides the secured advantages of germ destruction and elimination of putrid products, the disadvantages of chemical change in the milk, added infection, and inexpertness in modifications for infant use, are more or less avoided. It will be understood that so far as concentration of the milk goes, I prefer not to concentrate more than is required to meet the dietary needs of infants of one year old. If dehydrated to that degree, it is easily diluted for younger infants; but it is best not to heat or dehydrate milk for infant feeding more than is necessary. The invention however applies to the complete dehydration of milk under any known process.

The conveying and distributing container is formed so as to enable a complete and convenient cleansing of the whole interior of the container, preparatory to its repeated use. The container being of glass and having calibrating marks on its exterior is helpful to the user in showing the amount of milk remaining in the container its macroscopic purity and the amount that should be decanted at each pouring without unnecessary loss in using the milk. With the use of this container, there is a minimum possibility of aerial infection during the admixing of the concentrated milk with suitable amounts of the warm sterilized diluting water used in preparing the milk for immediate feedings.

In carrying out the method herein claimed, the use of a suitable closure for the final conveying and distributing container is an important matter, inasmuch as the ordinary cardboard closure-disk used does not prevent bacteria from growing thru or passing the circumferential edges of the closure disk into the milk. In transporting and distributing milk for infants, I prefer a container having a relatively small pouring orifice that can be conveniently closed with a cork stopper of moderate size and cost.

Figure 1:
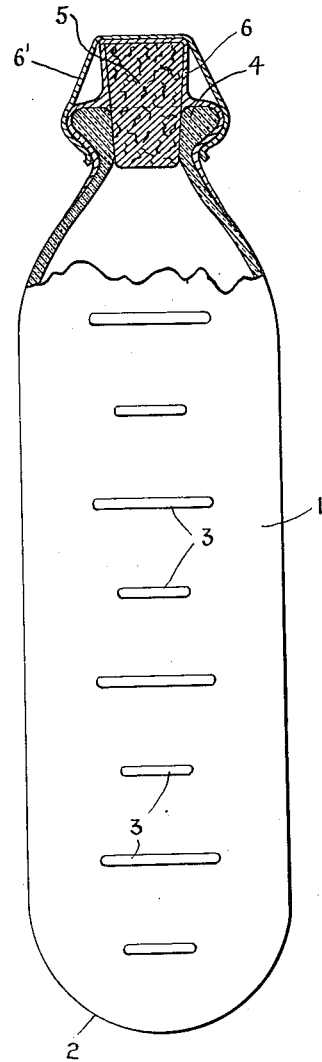

In the accompanying drawings, Fig. 1 represents partly in section, such a container; while Fig. 2 represents in section the upper part of a container having another type of closure that answers well for a milk container or larger size for general family use. Both of these closures act well in the process of pasteurizing the milk in the containers of which they are a part. In both there is effected a compressed sealing at or near to the top of the closure; the first by an outwardly expansible pressure of the inserted cork stopper against the glass lip; and the latter, by a downward compression of the metallic protecting and sealing cap of the closure. In both, the pouring surfaces are protected from infection before, during and after the pasteurization of the milk while in the container.

In Fig. 1, the reference character 1 represents the preferred type of container for use in carrying out my method. It has the rounded bottom 2, the calibration marks 3, the pouring surface and lip 4, and the cork stopper 5, the figure shows also the paraffine coating 6, and the metallic flexible capsule coating 6'. In Fig. 2, 7 is the upper part of a container for which I have already received patents. It has the rigid metallic compression covercap 8, which has lugs 9 that engage with the glass lugs 10 of the container, and the pouring surface 11 of the lip. 12 is a glass annular sealing ring and guide for the skirt part of the cap 8. In operating this device the closure disk 13, is compressed strongly down upon the top of the pouring edge of the lip 11. In a container of this character for general family use, an erect position for the container is not specially objectionable because of infrequent pourings from it, and because moderate infections in such general family use may be considered of negligible importance. Hence such a container may have a horizontal bottom; but in case of infant feeding with frequent small pourings from the container, the rounded form of its bottom encourages a tight replacement of the cork stopper. If milk is taken intermittently from a large bottle of unconcentrated milk, the possibilities of its infection in successive pourings, is greater than from the smaller corked container of concentrated milk. Furthermore, the old time practice of preparing whole milk and bottling it in the numerous feeding bottles needed for a full day's use of an infant, and their household pasteurization, is a defective practice because of the difficulty of securing effective pasteurizations by the general public, and adquately refrigerating the prepared milk in so many bottles. Furthermore, if milk is not prevented from undergoing low temperature fermentations prior to its pasteurization, the accumulation of objectionable ferment products in the milk is not prevented, or the elimination of such contaminants is not secured in milk by ordinary household pasteurization. The user of the milk treated by my method, is assured of better sanitary as well as hygiene value than when milk is treated by older methods.

What I claim as new is:

1. The method herein described, which consists in the following combination of steps: (1) producing milk in at least a relatively cleanly manner, (2) modifying the milk in a manner to make the milk more suitable for infant feeding, (3) heating, and eliminating volatile diffusive putrefactive contaminants from the milk, (4) placing the milk in a glass container having a hermetically possible closure-seal and a pouring surface, (5) hermetically sealing the closure, and protecting the pouring surface from infection, (6) subjecting the container and its contained milk to a pasteurizing heat, (7) cooling the pasteurized milk at a temperature below 40° F., said 2nd, 3rd, 4th, 5th, 6th and 7th steps being effectuated at a place sufficiently near to the point of production of the milk to secure the delivery of the milk at the place of treatment before the milk has undergone fermentation, and (8) transporting the milk to market and delivering it at substantially the temperature to which it has been cooled.

2. The method herein described, which consists in condensing an admixture of milk and a modifying constituent, eliminating putrefactive contaminants from the admixture, hermetically sealing the condensed admixture in a container, refrigerating the condensed milk and shipping the same to market while retaining it in its refrigerated condition.

3. The method herein described, which consists in, heating, partly dehydrating and eliminating contained putrefactive volatile matters from milk under the influence of a partial vacuum exhaust, any fermentation of said milk having been prevented during its treatment, sealing the milk in a container having a removable and replaceable closure entirely separable from the container, and subjecting the container, including its closure, and the contents of the container to a maintained temperture of sufficient intensity to prevent obvious fermentation in the milk for at least 36 hours.

4. As an article of commerce, a bottle of partly dehydrated modified pasteurized milk, that is free from putrefactive volatile constituents and live so-called pathogenic bacteria, and that is in a state of preservative temperature of a degree such as will inhibit substantially all bacterial growth in the milk.

5. The method herein described, which consists in modifying cow's milk to an approximation to human milk, coincidently heating and exhausting volatile ferment products from and dehydrating the milk, hermetically encasing the milk, pasteurizing the milk, and holding the pasteurized milk at a temperature of a degree such as will inhibit substantially all bacterial growth in the milk.

6. The method herein described, which consists in preventing proliferation of germs in milk, eliminating bacterial products from the milk that have originated outside of the milk, adding a casein-free matter to the milk capable of giving flocculent character to the casein in the milk in its coagulation, dehydrating and pasteurizing the milk, and preventing decomposition and other degrading changes in the milk, said milk being modified in relative similitude to human milk.

JOSEPH MOSES WARD KITCHEN.